United States Patent [19]
Ying

[11] Patent Number: 6,166,694
[45] Date of Patent: *Dec. 26, 2000

[54] PRINTED TWIN SPIRAL DUAL BAND ANTENNA

[75] Inventor: Zhinong Ying, Lund, Sweden

[73] Assignee: Telefonaktiebolaget LM Ericsson (publ), Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 09/112,152

[22] Filed: Jul. 9, 1998

[51] Int. Cl.$^7$ ............................................. H01Q 1/24
[52] U.S. Cl. ................................. 343/702; 343/700 MS; 343/895; 343/850
[58] Field of Search ............................ 343/700 MS, 895, 343/702, 850, 851, 852; H01Q 1/24

[56] References Cited

U.S. PATENT DOCUMENTS

| | | |
|---|---|---|
| 676,332 | 6/1901 | Marconi . |
| 1,837,678 | 12/1931 | Ryder . |
| 2,966,679 | 12/1960 | Harris ................................. 343/895 |
| 2,993,204 | 7/1961 | Macalpine ........................... 343/745 |
| 3,573,840 | 4/1971 | Gouillou ............................. 343/745 |
| 4,012,744 | 3/1977 | Greiser ................................ 343/895 |
| 4,121,218 | 10/1978 | Irwin .................................. 343/702 |

(List continued on next page.)

FOREIGN PATENT DOCUMENTS

| | | |
|---|---|---|
| 55898/73 | 11/1974 | Australia . |
| 0 372 720 | 6/1990 | European Pat. Off. . |
| 0 511 577 | 11/1992 | European Pat. Off. . |
| 0 522 806 | 1/1993 | European Pat. Off. . |
| 0 590 671 A1 | 4/1994 | European Pat. Off. . |
| 0 593 185 | 4/1994 | European Pat. Off. . |
| 0 635 898 | 1/1995 | European Pat. Off. . |

(List continued on next page.)

OTHER PUBLICATIONS

Jianbing Chen et al., "FDTD Analysis of Printed Square Spiral Antennas for Wireless Communications", IEEE Antennas and Propagation Society International Symposium 19 Digest, Montreal Quebec, vol. 3, Jul. 14, 1997, pp. 1550–1553.

"Microwave Filters and Antennas for Personal Communication Systems", Feb. 22, 1994, Electronics Division, Professional Groups E12, Digest No. 1994/047.

"Short Sinusoidal Antennas for Wireless Communications", by M. Ali et al., 1955 IEEE, pp. 542–545.

"A Wideband Dual Meander Sleeve Antenna" by M. Ali et al., 1995 IEEE, pp. 1124–1127.

Patent Abstracts of Japan, JP–0236602, Sep. 30, 1994.

"Antennas", by J.D. Kraus, (McGraw–Hill Book Co., Inc.) pp. 173–178 (1950).

"Microwave Scanning Antennas", edited by R.C. Hansen, Peninsula Publishing, pp. 116–122 (1950).

*Primary Examiner*—Don Wong
*Assistant Examiner*—Shih-Chao Chen
*Attorney, Agent, or Firm*—Burns, Doane, Swecker & Mathis, L.L.P.

[57] ABSTRACT

The present invention overcomes the above-identified deficiencies in the art by providing a miniature, built-in dual band antenna which is suitable for use in future compact mobile terminals. According to exemplary embodiments, a built-in antenna is provided which includes two spiral conductor arms which are of different lengths and capable of being tuned to different frequency bands. The spiral arms are mounted on the mobile terminal's printed circuit board via a substrate. Matching of the antenna is performed by a matching bridge which is positioned between a feeding pin and grounded post. By adjusting the length of the matching bridge, the matching of the antenna can be changed. In an alternative embodiment, a loading resistor is attached to the matching bridge in order to enhance the bandwidth of the antenna.

21 Claims, 7 Drawing Sheets

6,166,694
Page 2

U.S. PATENT DOCUMENTS

| | | | |
|---|---|---|---|
| 4,137,534 | 1/1979 | Goodnight | 343/752 |
| 4,161,737 | 7/1979 | Albright | 343/749 |
| 4,169,267 | 9/1979 | Wong et al. | 343/895 |
| 4,229,743 | 10/1980 | Vo et al. | 343/749 |
| 4,356,492 | 10/1982 | Kaloi | 343/700 MS |
| 4,571,595 | 2/1986 | Phillips et al. | 343/745 |
| 4,723,305 | 2/1988 | Phillips et al. | 455/89 |
| 4,742,359 | 5/1988 | Ishino et al. | 343/895 |
| 4,860,020 | 8/1989 | Wong et al. | 343/828 |
| 4,868,576 | 9/1989 | Johnson, Jr. | 343/702 |
| 4,887,265 | 12/1989 | Felix | 370/94.1 |
| 5,020,093 | 5/1991 | Pireh | 379/59 |
| 5,204,687 | 4/1993 | Elliott et al. | 343/702 |
| 5,216,436 | 6/1993 | Hall et al. | 343/895 |
| 5,298,910 | 3/1994 | Takei et al. | 343/895 |
| 5,311,201 | 5/1994 | Lillie et al. | 343/791 |
| 5,317,325 | 5/1994 | Bottomley | 343/702 |
| 5,353,036 | 10/1994 | Baldry | 343/702 |
| 5,363,114 | 11/1994 | Shoemaker | 343/828 |
| 5,386,203 | 1/1995 | Ishihara | 333/129 |
| 5,436,633 | 7/1995 | Liu | 343/723 |
| 5,438,339 | 8/1995 | Itoh et al. | 343/702 |
| 5,446,469 | 8/1995 | Makino | 343/702 |
| 5,451,974 | 9/1995 | Marino | 343/895 |
| 5,467,096 | 11/1995 | Takamoro et al. | 343/702 |
| 5,471,221 | 11/1995 | Nalbandian et al. | 343/700 MS |
| 5,479,178 | 12/1995 | Ha | 343/702 |
| 5,532,703 | 7/1996 | Stephens et al. | 343/702 |
| 5,546,094 | 8/1996 | Egashira | 343/702 |
| 5,548,827 | 8/1996 | Hanawa et al. | 455/129 |
| 5,550,820 | 8/1996 | Baran | 370/60.1 |
| 5,594,457 | 1/1997 | Wingo | 343/702 |
| 5,600,335 | 2/1997 | Abramo | 343/749 |
| 5,612,704 | 3/1997 | Cole | 343/702 |
| 5,635,943 | 6/1997 | Grunwell | 343/702 |
| 5,661,496 | 8/1997 | Baek et al. | 343/702 |
| 5,729,531 | 3/1998 | Raith et al. | 370/252 |
| 5,861,854 | 1/1999 | Kawahata et al. | 343/702 |
| 5,870,066 | 2/1999 | Asakura et al. | 343/895 |
| 5,903,240 | 5/1999 | Kawahata et al. | 343/700 MS |
| 5,926,139 | 7/1999 | Korisch | 343/702 |
| 5,929,825 | 7/1999 | Niu et al. | 33/895 |

FOREIGN PATENT DOCUMENTS

| | | |
|---|---|---|
| 0 644 606 | 3/1995 | European Pat. Off. . |
| 0 660 440 | 6/1995 | European Pat. Off. . |
| 0 747 989 | 12/1996 | European Pat. Off. . |
| 0 777 293 | 6/1997 | European Pat. Off. . |
| 0 855 759 | 7/1998 | European Pat. Off. . |
| 0 884 796 A2 | 12/1998 | European Pat. Off. . |
| 2 664 749 | 1/1992 | France . |
| 31 29 045 | 10/1982 | Germany . |
| 63-219204 | 9/1988 | Japan . |
| 6-37531 | 2/1994 | Japan . |
| 6-90108 | 3/1994 | Japan . |
| 6-152221 | 5/1994 | Japan . |
| 10-173430 | 6/1998 | Japan . |
| 2175748 | 12/1986 | United Kingdom . |
| WO93/12559 | 6/1993 | WIPO . |
| WO94/21003 | 9/1994 | WIPO . |
| 96/27219 | 9/1996 | WIPO . |
| WO96/38882 | 12/1996 | WIPO . |
| WO97/11507 | 3/1997 | WIPO . |
| WO97/15153 | 4/1997 | WIPO . |
| WO 97/47054 | 12/1997 | WIPO . |
| WO 97/49141 | 12/1997 | WIPO . |
| WO97/49141 | 12/1997 | WIPO . |
| WO 99/25042 | 5/1999 | WIPO . |
| WO 99/25043 | 5/1999 | WIPO . |

PRINTED TWIN SPIRAL DUAL BAND ANTENNA

RELATED APPLICATION

This application is related to U.S. patent application Ser. No. 09/112,366 to Ying, filed Jul. 9, 1998 and entitled "Miniature Printed Spiral Antenna for Mobile Terminals", which is incorporated herein by reference.

BACKGROUND

The present invention relates generally to radio communication systems and, in particular, to built-in antennas which can be incorporated into portable terminals and which allow the portable terminals to communicate within different frequency bands.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology, e.g., time division multiple access (TDMA) or code division multiple access (CDMA). Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

To provide an acceptable level of equipment compatibility, standards have been created in various regions of the world. For example, analog standards such as AMPS (Advanced Mobile Phone System), NMT (Nordic Mobile Telephone) and ETACS and digital standards such as D-AMPS (e.g., as specified in EIA/TIA-IS-54-B and IS-136) and GSM (Global System for Mobile Communications adopted by ETSI) have been promulgated to standardize design criteria for radio communication systems. Once created, these standards tend to be reused in the same or similar form, to specify additional systems. For example, in addition to the original GSM system, there also exists the DCS1800 (specified by ETSI) and PCS1900 (specified by JTC in J-STD-007), both of which are based on GSM.

However, the most recent evolution in cellular communication services involves the adoption of additional frequency bands for use in handling mobile communications, e.g., for Personal Communication Services (PCS) services. Taking the U.S. as an example, the Cellular hyperband is assigned two frequency bands (commonly referred to as the A frequency band and the B frequency band) for carrying and controlling communications in the 800 MHz region. The PCS hyperband, on the other hand, is specified in the United States to include six different frequency bands (A, B, C, D, E and F) in the 1900 MHz region. Thus, eight frequency bands are now available in any given service area of the U.S. to facilitate communication services. Certain standards have been approved for the PCS hyperband (e.g., PCS1900 (J-STD-007)), while others have been approved for the Cellular hyperband (e.g., D-AMPS (IS-136)).

Each one of the frequency bands specified for the Cellular and PCS hyperbands is allocated a plurality of traffic channels and at least one access or control channel. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, hand-off, and cell selection or reselection instructions as a mobile station travels out of the radio coverage of one cell and into the radio coverage of another cell. The control and voice channels may operate using either analog modulation or digital modulation.

The signals transmitted by a base station in the downlink over the traffic and control channels are received by mobile or portable terminals, each of which have at least one antenna. Historically, portable terminals have employed a number of different types of antennas to receive and transmit signals over the air interface. For example, monopole antennas mounted perpendicularly to a conducting surface have been found to provide good radiation characteristics, desirable drive point impedances and relatively simple construction. Monopole antennas can be created in various physical forms. For example, rod or whip antennas have frequently been used in conjunction with portable terminals. For high frequency applications where an antenna's length is to be minimized, another choice is the helical antenna.

As described above, it will soon be commercially desirable to offer portable terminals which are capable of operating in widely different frequency bands, e.g., bands located in the 900 MHz region and bands located in the 1800 MHz region. Accordingly, antennas which provide adequate gain and bandwidth in both frequency bands will need to be employed in portable terminals in the near future. Several attempts have been made to create such dual-band antennas.

For example, U.S. Pat. No. 4,571,595 to Phillips et al. describes a dual-band antenna having a sawtooth-shaped conductor element. The dual-band antenna can be tuned to either of two closely spaced apart frequency bands (e.g, centered at 915 MHz and 960 MHz). This antenna design is, however, relatively inefficient since it is so physically close to the chassis of the mobile phone.

Japanese patent no. 6-37531 discloses a helix which contains an inner parasitic metal rod. In this patent, the antenna can be tuned to dual resonant frequencies by adjusting the position of the metal rod. Unfortunately, the bandwidth for this design is too narrow for use in cellular communications.

Dual-band, printed, monopole antennas are known in which dual resonance is achieve by the addition of a parasitic strip in close proximity to a printed monopole antenna. While such an antenna has enough bandwidth for cellular communications, it requires the addition of a parasitic strip. Moteco AB in Sweden has designed a coil matching dual-band whip antenna and coil antenna, in which dual resonance is achieved by adjusting the coil matching component (¼λ for 900 MHz and ½λ for 1800 MHz). This antenna has relatively good bandwidth and radiation performances and a length in the order of 40 mm. A non-uniform helical dual-band antenna which is relatively small in size is disclosed in copending, commonly assigned patent application Ser. No. 08/725,507, entitled "Multiple Band Non-Uniform Helical Antennas."

Presently, antennas for radio communication devices, such as mobile phones, are mounted directly on the phone chassis. However, as the size and weight of portable terminals continue to decrease, the above-described antennas become less advantageous due to their size. Moreover, as the functionality of these future compact portable terminals increases, the need arises for a built-in miniature antenna which is capable of being resonant at multiple frequency bands.

Conventional built-in antennas currently in use in mobile phones include microstrip antennas and planar inverted-F antennas. Microstrip antennas are small in size and light in weight. The planar inverted-F antenna (PIFA) has already been implemented in a mobile phone handset, as described by K. Qassim, "Inverted-F Antenna for Portable Handsets", IEE Colloqium on Microwave Filters and Antennas for Personal Communication Systems, pp.3/1–3/6, February 1994, London, UK. And, more recently, Lai et al. has published a meandering inverted-F antenna (WO 96/27219). This antenna has a size which is about 40% of that of the conventional PIFA antenna.

FIGS. 1A and 1B illustrate the conventional planar patch antenna compared to the meandering inverted-F antenna described in Lai et al. The conventional planar patch antenna of FIG. 1A has both a size and length equal to, for example, a quarter wavelength of the frequency to which the antenna is to be made resonant. The conventional planar patch antenna also has a width W. The meandering inverted-F antenna, illustrated in FIG. 1B, also has a length equal to a quarter wavelength of the resonant frequency and a width equal to W; however, the size of the meandering inverted-F antenna is reduced to about 40% of the size of the conventional planar patch antenna. This reduction in size is attributable to the antenna's meandering shape.

However, as mobile phones become smaller and smaller, both conventional microstrip patch and PIFA antennas are still too large to fit the future small phone chassis. Moreover, these built-in antennas are not capable of being tuned to dual frequency bands. Such a capability will be necessary for next generation phones which need multiple antennas for cellular, wireless local area network, GPS and diversity.

SUMMARY

The present invention overcomes the above-identified deficiencies in the art by providing a miniature, built-in dual band antenna which is suitable for use in future compact mobile terminals. According to exemplary embodiments, a built-in antenna is provided which includes two spiral conductor arms which are of different lengths and capable of being tuned to different frequency bands. The spiral arms are mounted on the mobile terminal's printed circuit board via a substrate. Matching of the antenna is performed by a matching bridge which is positioned between a feeding pin and grounded post. By adjusting the length of the matching bridge, the matching of the antenna can be changed. In an alternative embodiment, a loading resistor is attached to the matching bridge in order to enhance the bandwidth of the antenna. The antenna of the present invention is of a printed twin-spiral design, is very small in size (the size is less than 1/10 of the wavelength at the operating frequency which results in an antenna which is 20–30% of the conventional PIFA antenna), dual band, and surface mountable.

BRIEF DESCRIPTION OF THE DRAWINGS

The above objects and features of the present invention will be more apparent from the following description of the preferred embodiments with reference to the accompanying drawings, wherein.

DETAILED DESCRIPTION

Figure 2:
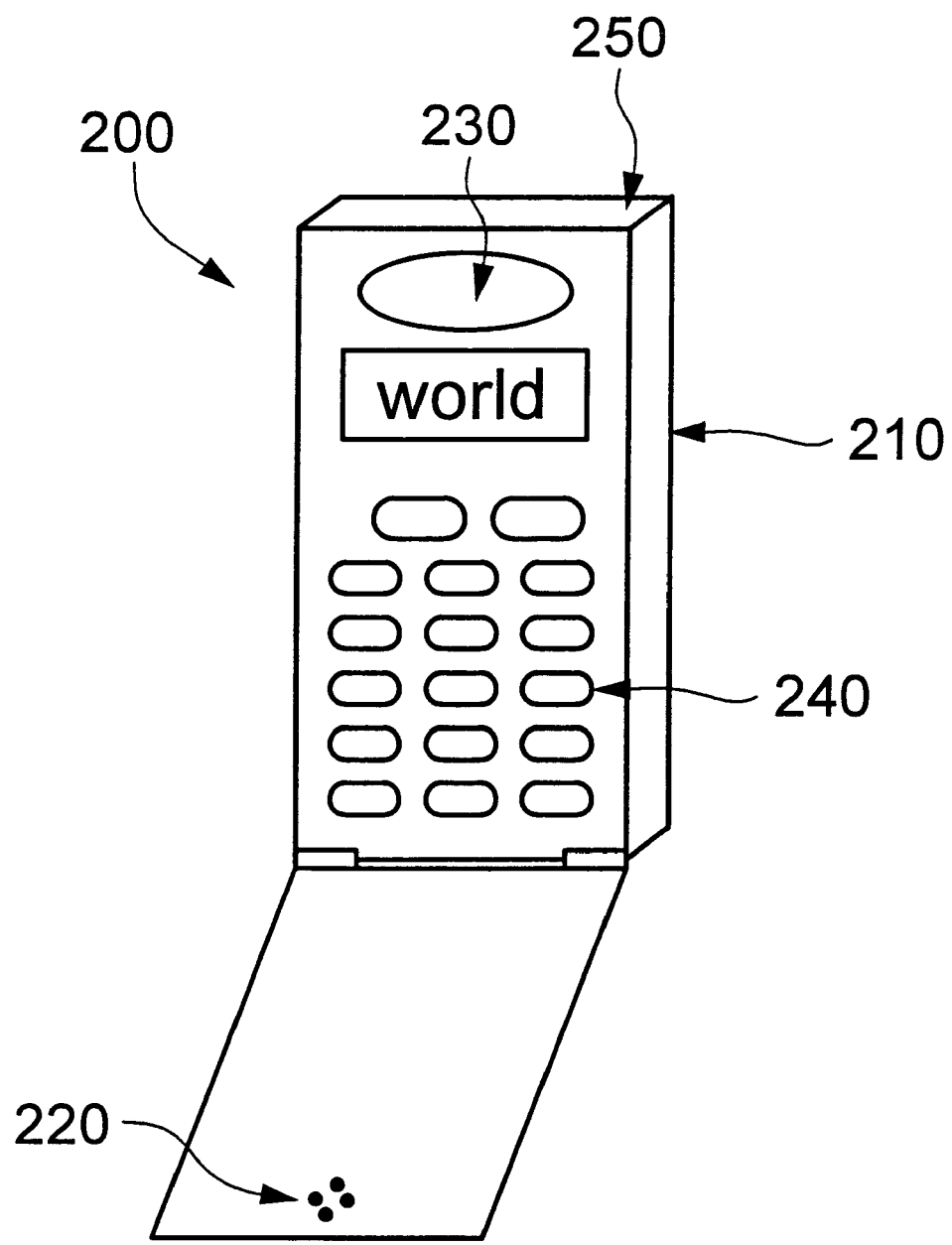
FIG. 2 illustrates a radio communication device in which the antenna of the present invention may be implemented.

FIG. 2 illustrates a radio communication device 200 in which the built-in multiple band antenna of the present invention may be implemented. Communication device 200 includes a chassis 210 having a microphone opening 220 and speaker opening 230 located approximately next to the position of the mouth and ear, respectively, of a user. A keypad 240 allows the user to interact with the communication device, e.g., by inputting a telephone number to be dialed. The communication device 200 also includes a built-in antenna assembly 250, the details of which will be described below.

Figure 3:
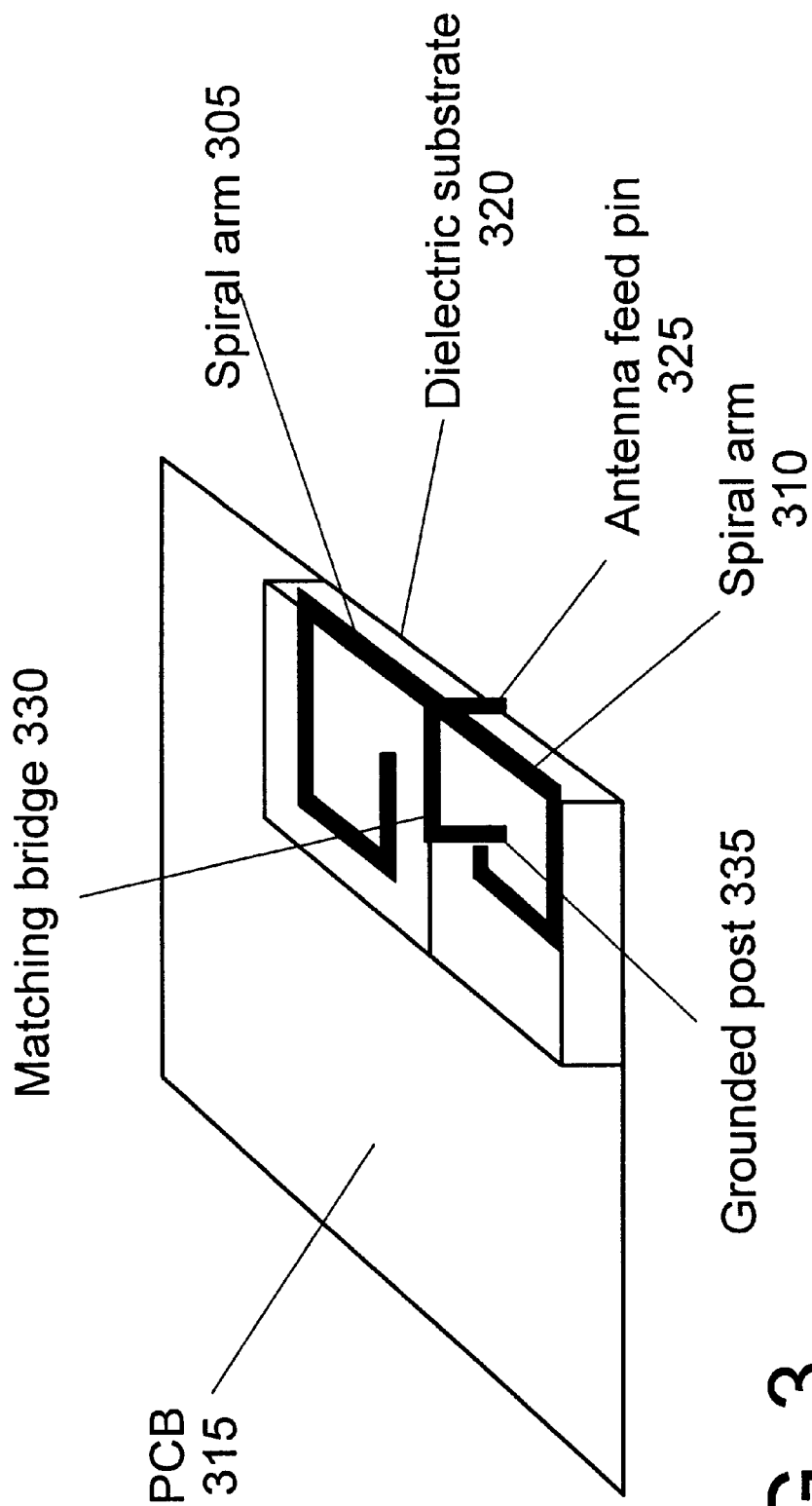
FIG. 3 illustrates the built-in multiple band spiral antenna according to a first embodiment of the present invention.

FIG. 3 illustrates the built-in antenna assembly according to an exemplary embodiment of the present invention. The built-in antenna assembly, according to the present invention, comprises two conductor arm 305 and 310, each of which is configured in an inner spiral shape. The two conductor arms 305 and 310 are attached to the printed circuit board (PCB) 315 via a dielectric substrate 320 and are connected at a joint connection point to a feeding pin 325. The spiral conductor arms are positioned over the PCB 315 and form slots between the conductor arms and the PCB 315. One skilled in the art will appreciate that the spiral slots form the main radiators (or sensors) of the present antenna system.

Figure 4:
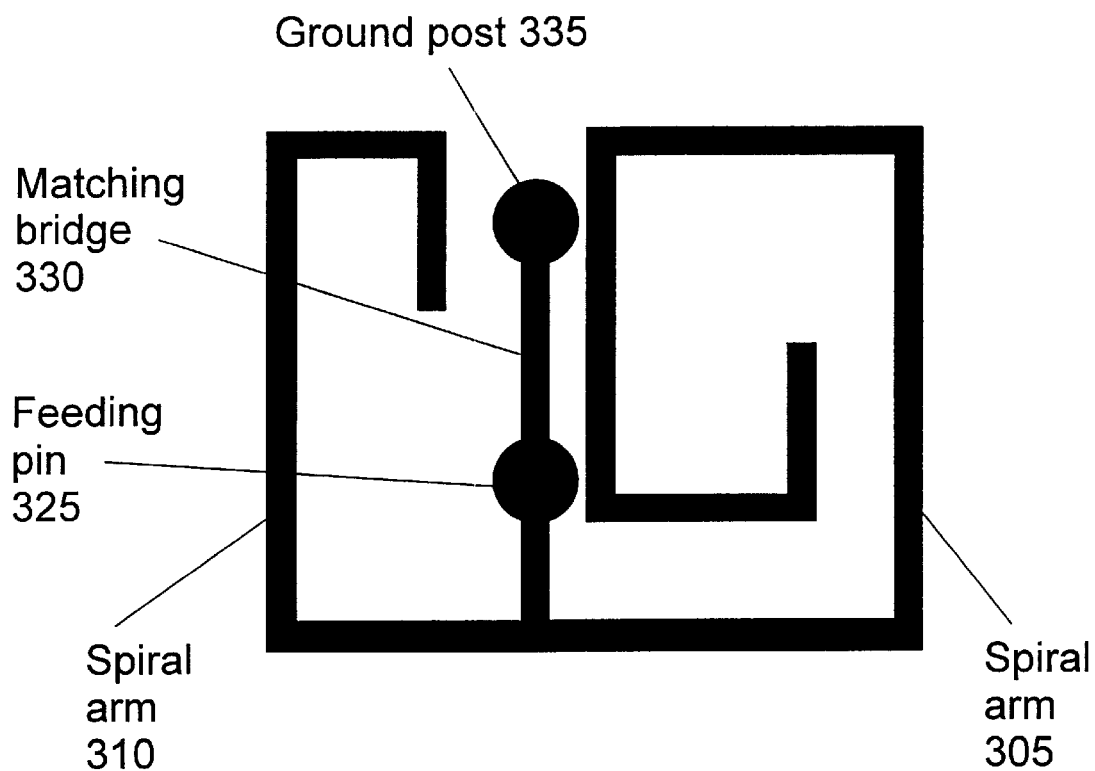
FIG. 4 illustrates a top view of the built-in multiple band spiral antenna of the present invention.

As evident from FIG. 3 and more clearly illustrated in the top view of FIG. 4, the conductor arms 305 and 310 are fed by the feeding pin 325 at the end of the outer turn of the spirals. One skilled in the art will appreciate that the current in the conductor arms decays as it travels from the feeding pin to the other end of the conductor arms. As a result, the antenna has higher radiation efficiency when the currents are distributed mostly in the outer edge of the conductor arms.

The built-in antenna also includes a matching bridge 330 positioned between the feeding pin 325 and the grounded post 335. The matching bridge 330 acts to tune the antenna and forms a small loop antenna between the feeding pin 325 and grounded post 335. Tuning of an antenna refers to matching the impedance seen by an antenna at its input terminals such that the input impedance is seen to be purely resistive, i.e., it will have no appreciable reactive component. The tuning of the antenna system of the present invention is performed by measuring or estimating the input impedance associated with an antenna and providing an appropriate impedance matching circuit (i.e., the matching bridge). The matching of the antenna, according to the present invention, can be adjusted by changing the length of the matching bridge 330. This is accomplished by simply changing the location of the grounded post 335. The length of the matching bridge is generally in the order of 0.01λ to 0.1λ.

It is evident from FIGS. 3 and 4 that the two conductor arms 305 and 310 of the antenna system are of different lengths. This allows the antenna system to operate in multiple frequency bands, as will be described in more detail below. By controlling the lengths of the conductor arms, the antenna is capable of being tuned to different frequencies. The first arm of the multiple band antenna 305 is of a length (generally a quarter wavelength of the frequency band to which the arm is to be tuned) and construction so as to be resonant at frequencies in a first lower band, and the second arm 310 is of a length and construction so as to be resonant at frequencies in a second higher band. The two arms can be made resonant at any frequency.

For example, the first band may be the GSM band and the second band may be the DCS band. As such, the first arm is approximately ¼ wavelength of a GSM signal (i.e., 900 MHz), and the second arm is approximately ¼ wavelength of a DCS signal (i.e., 1800 MHz). This allows the antenna to be easily tuned to dual resonances. While the present example sets forth that the first and second bands are GSM and DCS bands, respectively, one skilled in the art will appreciate that other combinations of frequency bands may be implemented without departing from the spirit and scope of the present invention. For example, other possible combinations of low and high bands could include GSM+PCS, GSM+WCDMA, DCS+WCDMA, GSM+GPS, GSM+ISM, or any other combination of lower and higher frequency bands.

The multiple band antenna can be manufactured as printed metal strips, a wire structure or etched onto a plastic frame. While the conductor arms are illustrated as being configured in an inner spiral shape, one skilled in the art will appreciate that other shapes could alternatively be chosen, such as a meandering or outer spiral shape. The inner spiral configuration, however, provides not only for a reduction in the overall size of the antenna (about 20% of the size of the conventional planar patch antenna), but also, as described above, higher efficiency.

The resonant frequencies and bandwidth of the built-in multiple band antenna of the present invention are dependent upon the area and thickness of the dielectric substrate, the type of dielectric material selected (i.e., the dielectric constant), the spiral length and the rate of expansion of the spiral. One skilled in the art will appreciate that an increase in the area or thickness of the dielectric substrate or tightness of the spiral or a decrease in the value of the dielectric constant results in an increase in the bandwidth which can be achieved.

As is evident from FIG. 3, the built-in multiple band antenna of the present invention can be mounted at the edge of the PCB which provides for better radiation efficiency and bandwidth. In addition, the PCB space requirement for the built-in multiple band antenna is minimized due to its small size.

Figure 1A:
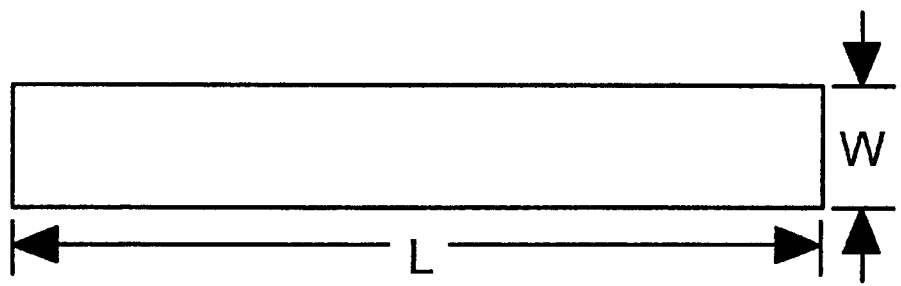
FIGS. 1A and 1B illustrate the conventional planar patch antenna compared to the conventional meandering inverted-F antenna.
Figure 1B:
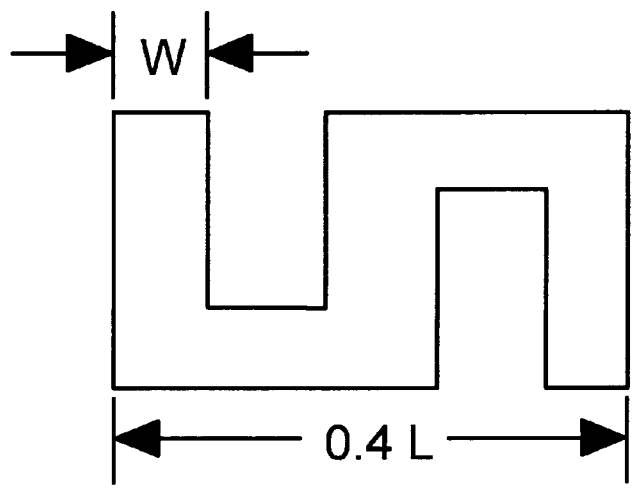

The antenna assembly of the present invention works as a magnetic antenna. As a result, the spiral metal strip creates nearly circular polarized waves (as opposed to linear polarized waves achieved by the conventional antennas described above with respect to FIGS. 1A and 1B) when the rate of expansion of the spiral (i.e., the tightness of the spiral) is chosen properly. This would be advantageous in a multipath environment, such as mobile radio communications, and in satellite (e.g., GPS) communications where circular polarized signals are generally used. Moreover, as a magnetic antenna, there is less interference from the human body.

Figure 5:
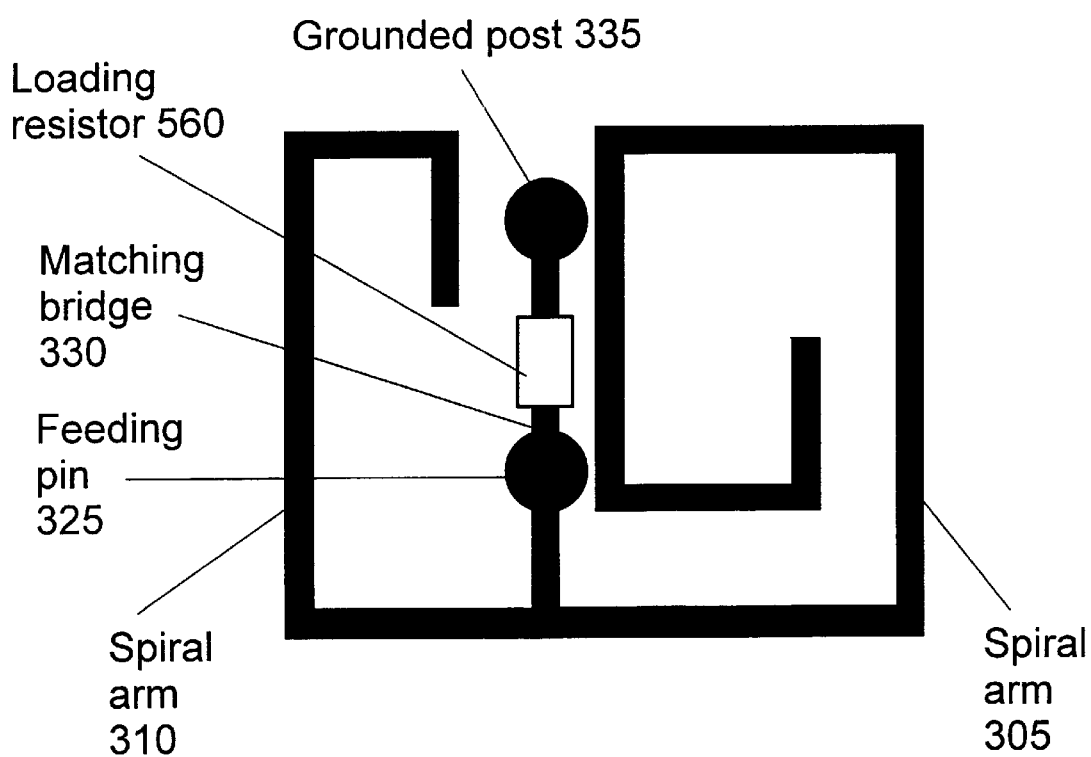
FIG. 5 illustrates the built-in multiple band spiral antenna according to a second embodiment of the present invention.

FIG. 5 illustrates the built-in spiral antenna according to a second embodiment of the present invention. One skilled in the art will appreciate that a printed antenna on a ground plane has a narrower bandwidth than the bandwidth of the earlier-described conventional monopole or dipole antenna. The bandwidth of such a printed antenna can be enhanced by introducing some loss to the system. This is evident from the fact that loss always indicates a lower Q-factor and thus a higher bandwidth. The following equation illustrates the relationship between the Q-factor and the achievable bandwidth:

$$Q=f0/BW$$

where f0 is the center frequency and BW is the bandwidth.

According to an exemplary embodiment of the present invention, a loading resistor 560 is connected in series to the matching bridge 330 in order to introduce loss into the system. In the alternative, the same result can be achieved by connecting the resistor 560 in parallel to the grounded post 335. The resistor of the present invention can be either a chip resistor or a resistor film. The resistor introduces loss in the antenna's radiated power which results in broader bandwidth.

The resistor value can be selected in order to satisfy particular design requirements. In a situation where high efficiency is needed (i.e., loss is to be kept small), a small resistor value should be used. However, in a situation where a wide bandwidth is critical, a larger resistor value should be used.

Figure 6:
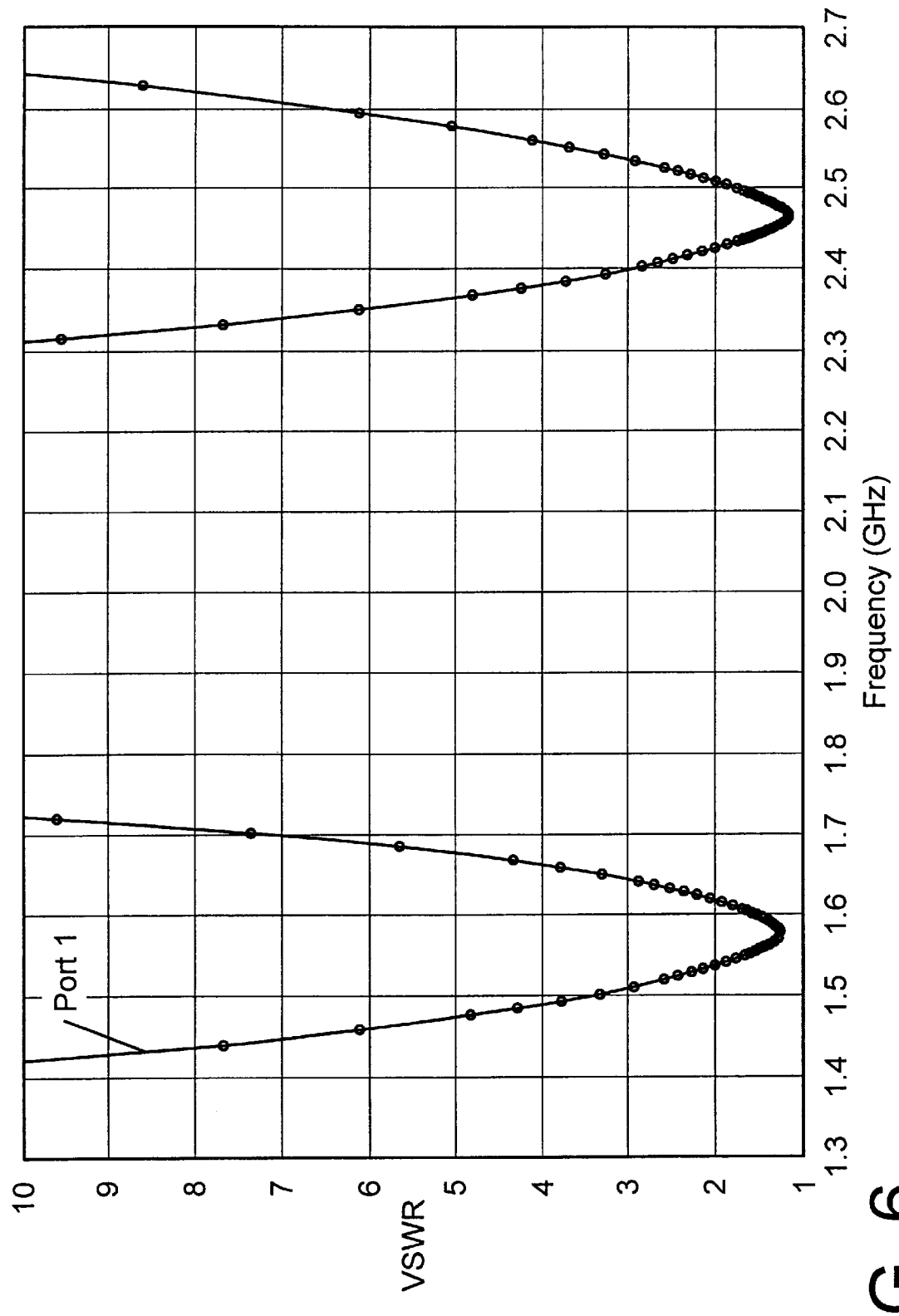
FIG. 6 illustrates a simulation result of a GPS/ISM-link dual band antenna of the present invention.
Figure 7:
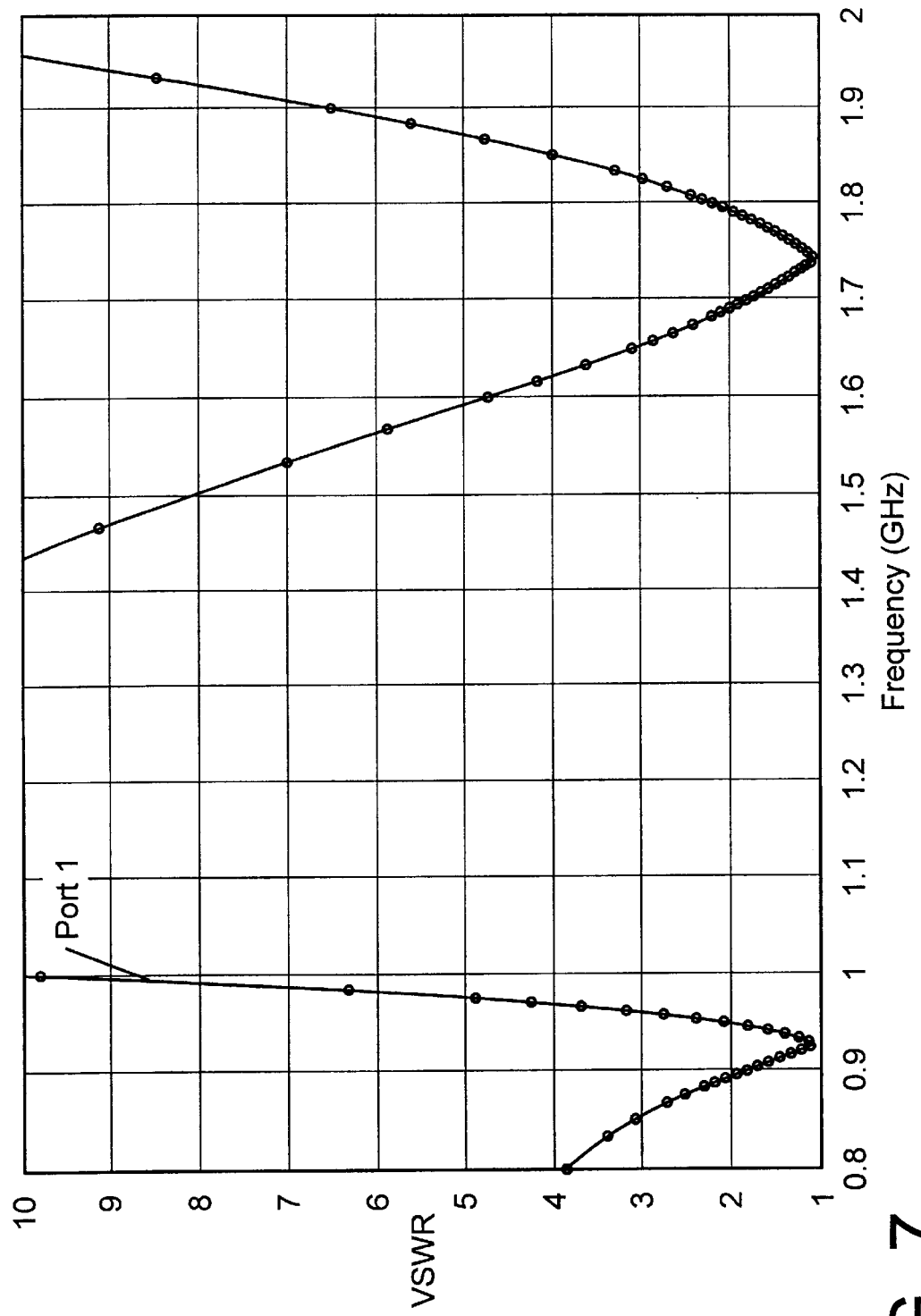
FIG. 7 illustrates a simulation result of a GSM/DCS dual band antenna of the present invention.

In order to illustrate the effectiveness of the present invention, FIGS. 6 and 7 set forth results of simulations for exemplary dual band antennas. The antennas in both simulations are mounted on a printed circuit board via a dielectric substrate. In the first simulation, the results of which are illustrated in FIG. 6, the dual band, twin spiral antenna has a length of 0.1 wavelength, a width of 0.05 wavelength and a height of 0.04 wavelength. The arms of the antenna are made resonant at the GPS and ISM frequency bands. The bandwidth of the antenna is 6.8% (i.e., about 107 MHz) at the GPS band and 4.5% (i.e., about 110 MHZ) at the ISM band for a VSWR less than 2.5:1. FIG. 6 illustrates the VSWR performance of the antenna of the present invention for the first simulation. It is evident from FIG. 6 that, since GPS requires a narrow band, it is possible to provide an even smaller antenna than that used in the simulation.

In the second simulation, the conductor arms of the antenna are made resonant at the GSM and DCS frequency bands. The dual band, twin spiral antenna has a length of 0.1 wavelength, a width of 0.07 wavelength and a height of 0.04 wavelength. In this simulation, a one ohm chip resistor is attached to the matching bridge in order to enhance the antenna's bandwidth. The bandwidth is 8.7% (i.e., about 80 MHz) at the GSM band and 8.8% (i.e., about 160 MHz) at the DCS band for a VSWR less than 2.5:1. FIG. 7 illustrates the VSWR performance of the antenna of the present invention for the second simulation.

The foregoing has described the principles, preferred embodiments and modes of operation of the present invention. However, the invention should not be construed as being limited to the particular embodiments discussed above. For example, while the antenna of the present invention has been discussed primarily as being a radiator, one skilled in the art will appreciate that the printed, twin spiral, dual band antenna of the present invention would also be used as a sensor for receiving information at specific frequencies. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A communication device for use in a radio communication system, said device comprising:
    a microphone opening for allowing the communication device to receive auditory information from a user;
    a speaker opening for allowing the communication device to transmit auditory information to said user;
    a keypad;
    a multiple band antenna comprising:
        a first arm and a second arm tuned to different frequency bands; and
        a matching bridge, connected to a feeding part in which each of the arms are attached, for matching an input impedance of said antenna,
    wherein said multiple band antenna is a built-in antenna.

2. The communication device of claim 1 wherein said first arm is resonant at frequencies in a lower band and said second arm is resonant at frequencies in a higher band.

3. The communication device of claim 1 wherein a shape of said first and second arms is one of an inner spiral, outer spiral and meandering shape.

4. The communication device of claim 1 wherein the matching of said antenna is adjusted by changing a length of the matching bridge.

5. The communication device of claim 1 wherein said first and second arms are shaped as inner spirals and currents in said first and second arms are fed at an end of an outer turn of said spirals.

6. The communication device of claim 1 further comprising a printed circuit board onto which said built-in multiple band antenna is mounted.

7. The communication device of claim 1 wherein lengths of said arms are selected to be approximately ¼ wavelength of the different frequency bands to which the arms are to be tuned.

8. The communication device of claim 1 further comprising a loading resistor attached to said matching bridge for enhancing a bandwidth of said antenna.

9. A communication device for use in a radio communication system, said device comprising:
    a printed circuit board mounted on a chassis of said communication device;
    a substrate attached to said printed circuit board and having a predetermined thickness; and
    an antenna mounted on said substrate and comprising:
        first and second spiral arms which are resonant at different frequencies and
        a matching bridge connected to the spiral arms, by way of a feeding point, for matching an input impedance of said antenna,
    wherein said antenna is a built-in antenna.

10. The communication device of claim 9 wherein said first arm is resonant at frequencies in a lower band and said second arm is resonant at frequencies in a higher band.

11. The communication device of claim 9 wherein the matching of said antenna is adjusted by changing a length of the matching bridge.

12. The communication device of claim 9 wherein lengths of said arms are selected to be approximately ¼ wavelength of the different frequency bands to which the arms are to be tuned.

13. The communication device of claim 9 further comprising a loading resistor attached to said matching bridge for enhancing a bandwidth of said antenna.

14. The communication device of claim 9 wherein a bandwidth of said antenna depends on a size of said spiral arms and the thickness and dielectric constant of said substrate.

15. An antenna for a radio communication device, said antenna comprising:
    two printed spiral arms each of which is tuned to a different frequency band;
    a matching bridge connected to the spiral arms for matching an input impedance of said antenna; and
    a loading resistor attached to the matching bridge for enhancing a bandwidth of the antenna wherein said antenna is a built-in antenna.

16. The antenna of claim 15 wherein a first arm of said antenna is resonant at frequencies in a lower band and a second arm of said antenna is resonant at frequencies in a higher band.

17. The antenna of claim 16 wherein said first arm is longer than said second arm.

18. The antenna of claim 15 wherein the matching of said antenna is adjusted by changing a length of the matching bridge.

19. The antenna of claim 15 wherein said printed spiral arms are connected to a printed circuit board of said radio communication device via a substrate.

20. The antenna of claim 19 wherein a bandwidth of said antenna is dependent on a size of said printed spiral arms and a thickness and dielectric constant of said substrate.

21. The antenna of claim 15 wherein currents in said printed spiral arms are fed at an end of an outer turn of said spirals.

* * * * *